United States Patent [19]

Martineau

[11] 4,383,417

[45] May 17, 1983

[54] SOFT-SERVE FREEZER CONTROL

[75] Inventor: Tom N. Martineau, Kiel, Wis.

[73] Assignee: Stoelting, Inc., Kiel, Wis.

[21] Appl. No.: 298,677

[22] Filed: Sep. 2, 1981

[51] Int. Cl.³ .......................... A23G 9/00; F25C 1/00
[52] U.S. Cl. ..................................... 62/127; 62/136; 62/233
[58] Field of Search .................. 62/66, 68, 135, 136, 62/139, 233, 340, 342, 127, 129, 130, 126, 125

[56] References Cited

U.S. PATENT DOCUMENTS

| | | | |
|---|---|---|---|
| 1,449,458 | 3/1923 | Sutermeister | |
| 1,987,258 | 1/1935 | Kinzey | 62/136 |
| 2,116,002 | 5/1938 | Shaw | 62/136 |
| 3,013,398 | 12/1961 | Thomas | 62/233 |
| 3,180,104 | 4/1965 | Goetz | 62/136 |
| 3,188,826 | 6/1965 | Carpiglani | 62/136 |
| 3,898,859 | 8/1975 | Duke | 62/233 |
| 4,257,237 | 3/1981 | Hoenisch | 62/233 |
| 4,275,567 | 6/1981 | Schwitters | 62/136 |

Primary Examiner—Albert J. Makay
Assistant Examiner—Harry Tanner
Attorney, Agent, or Firm—Henry C. Fuller

[57] ABSTRACT

A soft-serve freezer operates in a first mode, with both the auger and compressor operating, and a second energy saving mode in which only the refrigeration compressor operates. The control circuit monitors the power level to the auger to control the consistency of the mix. When the mix achieves a selected consistency, the auger discontinues its mixing function. Signal lights are provided to indicate when it is necessary to actuate the auger to obtain the desired consistency prior to dispensing the product and indicate that the mix has achieved the desired consistency.

10 Claims, 2 Drawing Figures

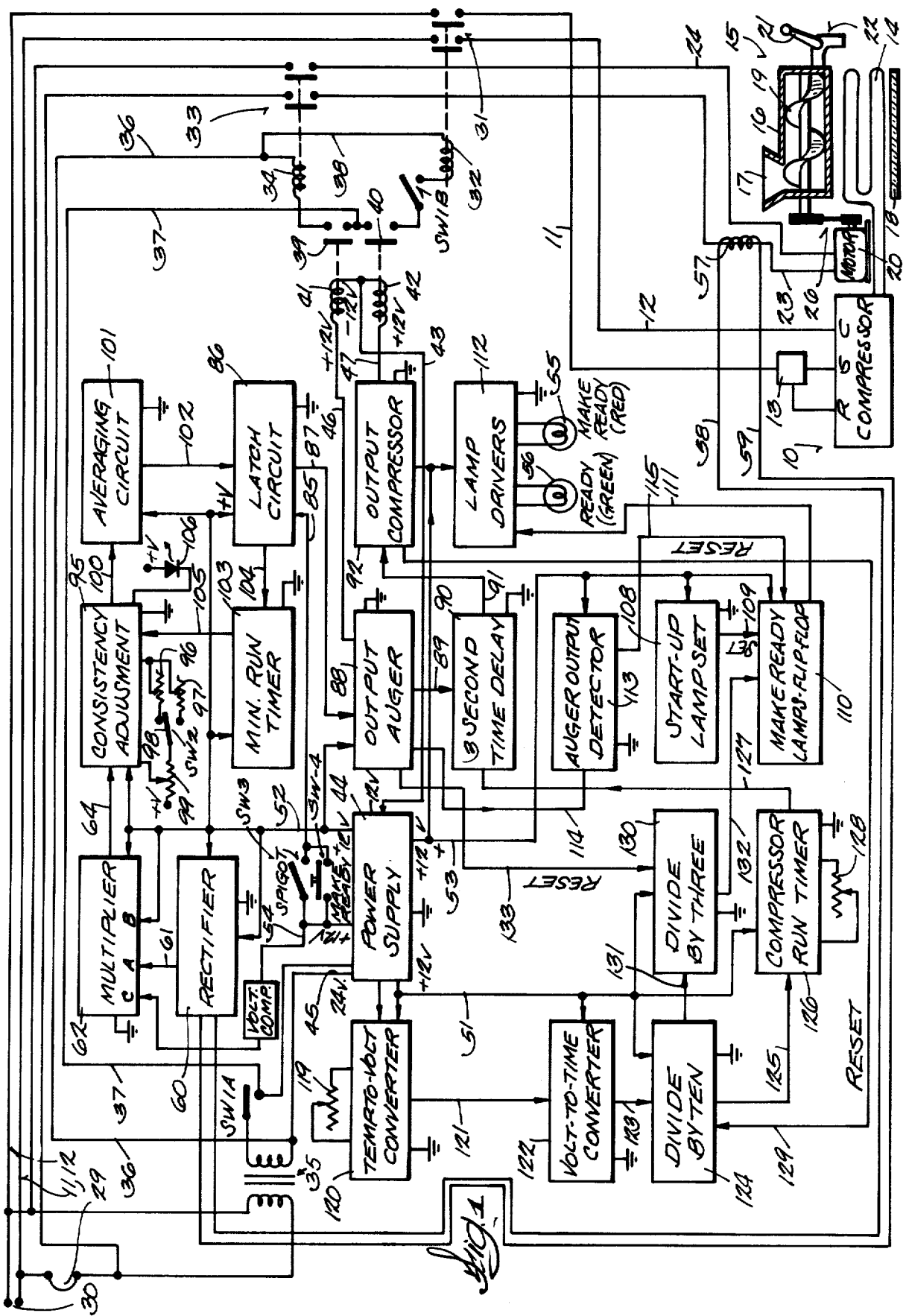

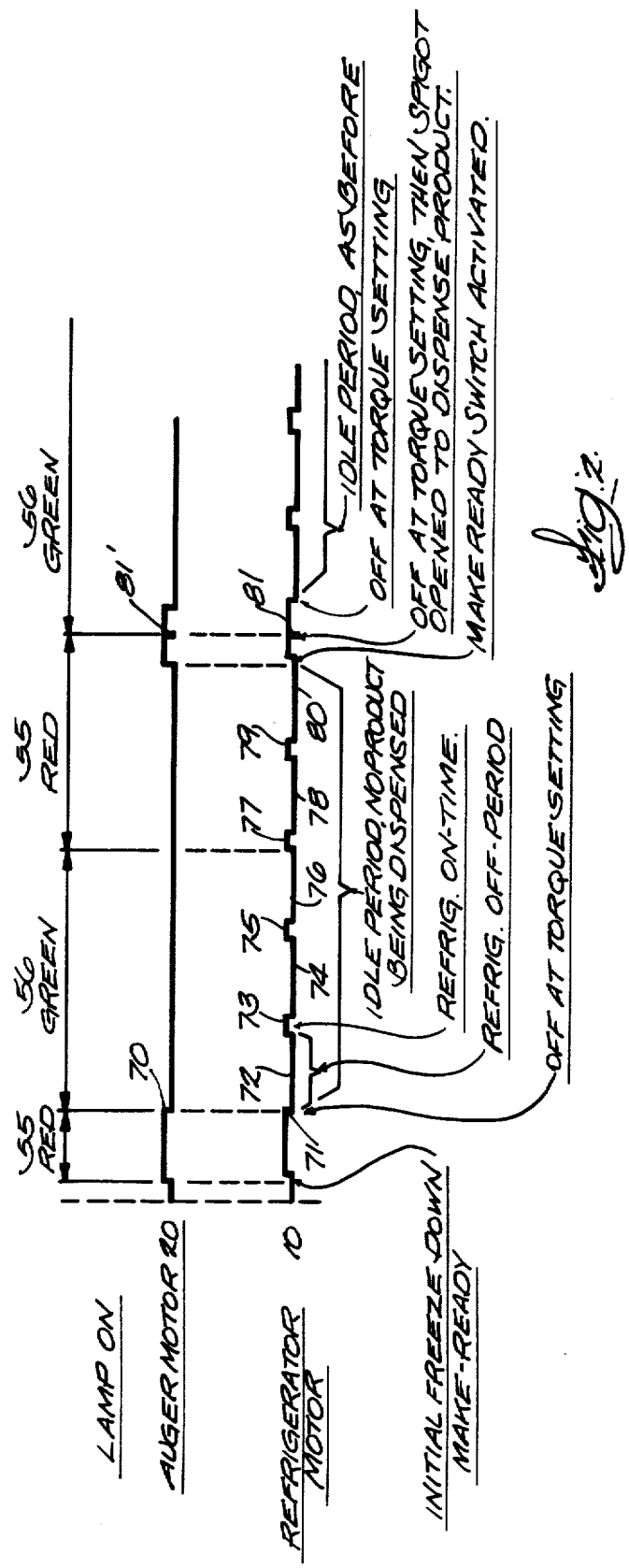

SOFT-SERVE FREEZER CONTROL

BACKGROUND OF THE INVENTION

This invention relates to soft-serve freezers of the type used to manufacture and dispense products such as frozen custard, ice cream, ice milk and the like. In particular, the invention is concerned with providing control for minimizing electric power consumption, minimizing wear of moving parts and apprising the operator of the condition of the product so that it can be assuredly put in optimum consistency before it is served.

Generally, soft-serve freezers are comprised of a freezing cylinder that is charged with a suitable mix from a storage hopper. A motor driven auger is located concentrically within the cylinder and it serves to agitate and whip the mix during freezing and to force the mix out through a spigot when it is manually opened to dispense product.

Typically, soft-serve freezers are used to dispense an ice cream or custard mix which has a suitable consistency for being consumed as a ice cream cone or a sundae, for example. In retail outlets where such products are customarily sold, dispensation of product to customers may occur at high or low periodicity. However, the product must be available at a temperature and consistency that provides customer satisfaction when it is served.

SUMMARY OF THE INVENTION

An important object of the present invention is to provide a control system which minimizes electric energy consumption by the dispensing freezer, particularly when it is standing in an idle condition but is maintained in a state of readiness for serving product. An adjunct to this object is to provide for the freezer going automatically into an electric energy-saving mode such as overnight or at other times during which product is not being dispensed or is being dispensed infrequently.

Another object is to provide for only refrigerating the product during the energy-saving mode, that is, avoiding use of the auger agitator during this mode. A corollary to this object is that the creamy mix does not become overagitated or excessively aerated which is manifested by the dispensed product being too fluidic and unattractive as is the case in some pre-existing dispensing freezers.

Another object is to provide for avoiding unnecessary operational intervals of the auger, not only for the purpose of conserving electric power, but also for minimizing wear of the drive system and wear between the auger blades and the freezing cylinder.

A very important object is to provide a visual indication of the condition of the mix so that the operator can respond by taking simple measures to optimize the condition. A corollary to this object is to provide a visual indication to the operator that the freezer has been in its energy-minimizing mode for such a long time that agitation of the mix is required before a serving is dispensed. In addition, a visual indication, such as by means of a lamp and legend, is provided to the operator as an indication that a push-button switch should be pressed to bring about optimization of the consistency of the mix by agitating it and refrigerating it further in contemplation of dispensing the next serving. Further, a visual indication is provided a short time thereafter, as to when the mix is ready to serve.

Another feature of the new control system is that it determines and controls consistency of the mix precisely by monitoring the wattage consumed by the auger drive motor. Three inaccurate but commonly used prior art methods for determining consistency were to simply monitor motor current, refrigeration suction line temperature or pressure or the mechanical torque imposed on the auger.

In a dispensing freezer with which the new control system may be used, liquid ice cream mix is frozen to the walls of a cylinder and an auger in the cylinder scrapes the mix off and mixes or agitates it. As temperature of the mix inside of the cylinder falls and continued freezing takes place, the viscosity of the mix increases. The term "auger" as used herein is intended to be a generic designation for any paddles, augers or beaters and the like which may be used to agitate the consummable mixture in the cylinder.

In accordance with the new control system, for initial freezedown, the operator pushes a "push-to-serve" switch (hereinafter called a "make-ready" switch) for turning the auger drive motor and, shortly thereafter, turning the refrigerator compressor motor on. The auger and compressor motors will remain on until the product has reaching is proper consistency at which time the refrigerator and auger motors turn off and an indicator lamp associated with a push-buttom switch indicates to the operator that the product is ready to serve. The amount of time that the refrigerator compressor stays off is governed by the ambient temperature. The refrigerator is run periodically to compensate for the heat loss through the auger cylinder insulation. Any time that product is dispensed from the spigot of the freezer, a timer is automatically reset to start its timing of the refrigerator off periods after the freezer has shut off. If no product is dispensed, the system goes automatically into an idle cycle or energy-saving mode. After the off period, as previously described, only the refrigerator will come on at automatically timed intervals. By way of example and not limitation, periodic refrigeration, such as for less than a minute, may occur variously at 5 to 15 minute intervals, depending on ambient temperature. The auger motor does not turn on during a perdetermined number of these intervals, typically somewhere between 2 and 6 intervals, depending on how the timer is programmed. After a predetermined number of these idle mode short refrigeration intervals occur, the "make-ready" light turns on, indicating to the operator that the freezer should be switched to its make-ready mode if dispensing product is contemplated.

During the make-ready mode, the agitating auger and refrigerator are operated concurrently. When auger motor wattage indicates that the mix has reached a proper consistency for serving, the auger motor shuts off and the idle cycles are reinstated if no product mix is served. However, if product is dispensed at this time, the auger drive motor and compressor drive motor will turn on and stay on as long as the dispenser spigot is open. When the spigot is closed, the auger drive motor and compressor will remain on for a short minimum time or until the controller senses that the ice cream mix product in the freezer cylinder has reached its proper consistency. If product is dispensed after a certain number of idle period cycles, the timer resets and starts counting over after the freezer shuts off and the controller starts its idle cycles over again.

How the foregoing and other more specific objects are achieved and how the foregoing and other functional features are implemented will now be described in reference to the drawings.

DESCRIPTION OF THE DRAWINGS

FIG. 1 is a block diagram of a soft-serve freezer and the new control system; and FIG. 2 is a timing diagram which is useful for describing the invention.

DESCRIPTION OF A PREFERRED EMBODIMENT

The basic components of a soft-serve freezer are depicted in the lower right portion of FIG. 1. These components include a refrigerator unit designated by a block labelled as a compressor and having the reference numeral 10. The refrigerator unit is conventional in that it contains a compressor and a compressor drive motor within a single sealed housing. A pair of power lines 11 and 12 supply electrical energy to the refrigerator motor. Motors used with such compressors are typically capacitor types. Thus, three motor input leads marked C, S and R indicate the conventional capacitor, start and run circuits of the motor. The capacitor switching relay is indicated by the block market 13 and is conventional. Some parts of the refrigerator unit have been omitted but the evaporator coil is shown and is symbolized by the serpentine shaped line marked 14.

The ice cream mix product conditioning, freezing and dispensing unit is designated generally by the numeral 15. This unit comprises a metal cylinder 16 having a fluid product input port 17. A hopper, not shown, is usually mounted above the input port for feeding unfrozen ice cream mix or the like to the interior of cylinder 16. Refrigeration coil 14 is in heat exchange relationship with the exterior of cylinder 16 for the purpose of cooling the mix to increase the viscosity. Insulation which normally surrounds the freezer coil 14 and cylinder 16 is symbolized by the rectangle marked 18.

Within cylinder 16 there is an auger 19 that is driven by a motor 20 through the agency of a speed reducer pulley and belt system 26. The auger scrapes the frozen product from the interior walls of cylinder 16 and mixes it with the remainder of the product in the cylinder to obtain a mixture of uniform consistency or viscosity. Consummable product is dispensed by operating the lever 21 of a spigot 22. The power input lines to auger drive motor 20 are designated by the reference numerals 23 and 24.

Refer now to the upper left region of FIG. 1. The power input terminals for the dispensing freezer are identified by the numeral 30. By way of example, the power line voltage may be 240 volts ac. Previously mentioned power lines 11 and 12 which supply the motor in refrigerator compressor unit 10 are again identified in the upper left region of FIG. 1. Tracing these lines will reveal that they include a pair of relay contacts 31 which are shown in their open circuit position in the far right region of the drawing. These contacts are operated by means of a relay coil 32. When relay coil 32 is energized, contacts 31 close and cause the motor in refrigerator compressor 10 to run.

One may see that previously mentioned power lines 23 and 24, which supply the auger motor 20, are also connected directly to power input terminals 30. One line has a magnetic circuit breaker 29 in it. Tracing these lines reveals that they include a pair of contacts 33 which are shown in their open state. Contacts 33 are operated by a relay coil 34. When the contacts 33 close, of course, auger drive motor 20 runs and turns the auger 19 for mixing the ice cream mix in freezing cylinder 16. By way of example and not limitation, relay coil 32 for the compressor motor and relay coil 34 for the auger drive motor may be operated with a low applied voltage such as 24 volts. The relatively low control voltage is obtained from the secondary winding of a step-down transformer 35 which is located in the upper left region of FIG. 1. Two conductors 36 and 37 are connected to the secondary winding terminals of transformer 35 through one side of a double pole-double throw switch SW1A. The other side, SW1B, will be pointed out later. Conductor 36 leads directly to relay coil 34 and to a jumper 38 which allows relay coil 34 and the other relay coil 32 to be energized from supply line 36. Line 37 serves as a common return line. Relay coil 34 is in a circuit with contacts 39 that are operated by a relay coil 41. Contacts 39 must be closed to establish current flow from line 36 to relay coil 34 and to common line 37. Another set of contacts 40, operated by a relay coil 42, are in a circuit with relay coil 32. The other side, SW1B, of the aforementioned double pole-double throw is in series with relay coil 32. The ganged switch contacts SW1A and SW1B are closed when it is desired to power-up or put the system in operation. When switch SW1B is closed and contacts 40 are closed, compressor motor relay coil 32 becomes energized by reason of current flowing from line 38, through relay coil 32, switch SW1B, contacts 40 and to common line 37.

Auger motor controlling contacts 39 are operated by relay coil 41 whose operating voltage, by way of example and not limitation, may be 12 volts. The other relay coil 42, whose energization brings about energization of relay coil 32 and the refrigerator compressor motor, is supplied with the same voltage as relay coil 41. The negative supply line is marked 43 and inspection of the circuit will reveal how it makes a common connection to relay coils 41 and 42. The negative line 43 for these relays leads from a dc power supply unit that is designated generally by the reference numeral 44. The input lines 45 to this power supply connect to the output terminals of the secondary winding of step-down transformer 35. Thus, by way of example, the input to power supply 44 may be 24 volts and the output may be 12 volts at the option of the circuit designer. In any event, for present purposes one should recognize that if line 46 running from relay coil 41 becomes energized with +12 V dc from power supply 44, contacts 40 will close to bring about energization of relay coil 32 which closes contacts 31 and results in energization of the motor in refrigerator compressor 10.

To avoid the need for any further mention, observe that, as diagrammed, there are three dc supply lines 51, 52 and 53 running out of dc power supply 44 for supplying the same operating voltage to the various electronic components of the control system.

The structure and functions of the controller will now be described concurrently. Assume that liquid ice cream product mixture is being supplied to auger cylinder 16 and that it is desired to activate the system, that is, initiate freeze-down of the mix. The first thing to do is manually close ganged switches SW1A and SW1B which may be done with a common operator. Closing switch SW1A energizes the voltage reducing and regulating power supply 44 from the secondary of transformer 35. Closing switch SW1B enables the auger motor and the compressor motor to be operated provided "make-ready" switch SW4 has been closed to initiate freeze-down. Notice that above the power supply 44 in the drawing there is an output line 54 for feeding through one or both of two switches. One of the switches is labelled "spigot" and SW3. The other is labelled "make-ready" and SW4. For brevity, SW3 will normally be called the spigot switch and SW4 will be called the make-ready switch. The spigot switch closes every time the spigot lever 21 is operated to deliver soft-serve product out of spigot 22. The make-ready switch SW4 is operated manually when it is necessary to bring about final conditioning of the product in the auger cylinder in contemplation of dispensing product. In the commercial embodiment of the freezer, the make-ready switch is a push-button type where the push-button is labelled "push-to-serve" which really means push to make ready for serving. When the indicator lamp is on, the operator is informed that the make-ready switch should be depressed momentarily to initiate operation of the auger in contemplation of soon dispensing mix from the spigot. In other words, the controller may have been in its energy-saving mode for an extended period of time during which the auger has not run. In such case, although the product will have been constantly refrigerated, it is necessary to run the auger for a short interval to assure uniform product viscosity in the mixer. In the FIG. 1 block diagram, the make-ready indicator lamp is given the numeral 55. In the commercial embodiment, this lamp provides a red light. Another indicator lamp 56 is shown adjacent make-ready indicator lamp 55. Indicator lamp 56 provides a green light in the commercial embodiment where it is covered by a light-transmitting shield that is labelled "ready-to-serve." In FIG. 1 it is simply labelled "ready." When this green light is produced by energization of lamp 56, the operator is informed that the final make-ready interval has been completed and that mix of proper consistency can be withdrawn from the spigot.

As indicated earlier, proper consistency of the mix in cylinder 16 for serving is determined by sensing the wattage consumed by auger motor 20. When consistency of the ice cream product has reached the proper stiffness for serving, the resistive torque imposed by auger 19 on motor 20 causes the motor to reach a particular wattage input level. Relying upon auger drive motor 20 wattage for indicating stiffness of the ice cream mix requires simultaneous detection of auger motor current and voltage. A current transformer 57 is connected around power line 23 which supplies auger drive motor 20. The leads 58 and 59 from the secondary winding of current transformer 57 run to a rectifier that is symbolized by the block marked 60 and labelled rectifier. This is a precision rectifier whose output line is marked 61. This output connects to an input A of a multiplier 62. The dc output 61 from rectifier 60 to input A is a voltage signal that is proportional to the current flowing to auger drive motor 20. A line leading from rectifier output line 52 to input B of the multiplier 62 supplies the multiplier with rectified and unfiltered voltage. Hence, the dc voltage to input B is proportional to the ac voltage that is applied to auger motor 20. A voltage compensator (volt. comp.) 66 is interposed between a dc output of power supply 44 and input C of multiplier 62. The compensator provides a signal to the multiplier 62 representative of the reciprocal of phase angle $\theta$. Power $(P) = EI \cos \theta$ or $P = EI \div 1/\cos \theta$ where E is the signal representative of auger motor voltage to multiplier input A and I is the signal representative of auger motor current to multiplier input B. The output of the multiplier on line 64 therefore corresponds to $A \times B \div C$. Multiplier 62, as can be seen multiplies the voltage signal corresponding to the ac current delivered to auger motor 20 and the dc voltage corresponding to the ac power line voltage applied to auger motor 20 at the same time the current is flowing. Thus, the output from multiplier 62 on line 64 is a voltage signal corresponding to the product of the current and voltage supplied to auger motor 20 and, hence, the wattage consumed by the auger motor 20. Auger motor torque and wattage input increases as the soft-serve mix freezes to a thicker viscosity. When the wattage consumed by auger driver motor 20 reaches a preset level, the corresponding signal on output line 64 of multiplier 62 is used to cause shutdown of the motor in refrigerator compressor unit 10 since it, or course, began to operate when freeze-down was initiated by closing switches SW1A and SW1B. The manner in which the controller functions to effectuate the freeze-down cycle will be discussed in greater detail later. For the moment, it is only necessary to be aware that during the freezedown cycle, the compressor 10 and auger drive motor 20 will run until the mix has reached proper consistency and then the system will go into its energy-saving mode wherein the compressor will remain off for substantial time intervals and then turn on for short intervals to keep the mix in a satisfactorily viscous condition.

Various operating conditions will be examined before proceeding with the description of the controller's construction. Attention is invited to the FIG. 2 timing diagram. In this diagram, the timing functions of the auger motor and refrigerator motor are labelled correspondingly. Observe in FIG. 2 that, during the freezedown cycle which was just briefly discussed, the auger drive motor 20 will turn on in response to the momentary make-ready switch SW4 being operated and a few seconds later the refrigerator motor will turn on. Both will run for that period of time which is required to bring up the soft-serve ice cream mix in the auger cylinder 16 to the proper viscosity or consistency. During this time, make-ready indicator lamp 55 will be energized for displaying a red indication to the operator. When the desired consistency is reached, as a result of the wattage consumption of the auger motor 20 exceeding set point, the auger motor turns off and a few seconds later, the refrigerator motor turns off. As the legend above the auger motor timing diagram reveals, ready lamp 56 is then switched to green and it remains green for a definite amount of time, indicating that the mix is in condition for serving during that time as will be more fully explained later. The turn-off time of auger motor 20 furing the initial freezedown cycle is indicated in FIG. 2 by the numeral 70 and the slightly delayed turn-off time of the refrigerator motor is indicated by the numeral 71. When these motors turn off, assuming no frozen mix is withdrawn through the spigot, the system goes into its idle or energy-saving mode. In this mode, the refrigerator motor is initially off for a time interval marked 72 and then it turns on for a typical time interval 73 which is followed by off intervals such as those marked 74, 76, 78 and 80 between which there are short refrigerator "on-time" intervals 75, 77 and 79. As will be explained, the controller is provided with means for permitting the frequency and durations of the off and on periods to be selected. Moreover, the number of on-off cycles such as 72,73 and 74,75 and 76,77 before which the auger motor must be commanded to run may be selected. In this illustrative example, during the first three cycles comprised of off-time intervals 72,73 and 74,75 and interval 76 the mix is assumed to remain in a ready-to-serve condition. In accordance with the invention, and by means of which will be described in greater detail later, the amount of time that the compressor stays off is governed by the ambient temperature. By way of example and not limitation, the off periods such as the one marked 72 might have a fifteen-minute duration if the ambient temperature were 70° F. and have a shorter duration such as five minutes if the ambient temperature is high such as near 100° F. The off periods, are, of course, shorter if the ambient temperature is high, since a greater heat gain by the mix in the cylinder 16 through the freezer insulation from the environment can be expected under high ambient temperature conditions.

The refrigerator on-time periods such as the one marked 73, during the idle or energy-saving mode, are governed strictly by a selectable timing function independently of ambient temperature. During the first on-off cycles, such as to the end of off period 76, the green ready light 56 will remain on to indicate to the operator that the mix is ready to serve. The interval during which the green lamp remains energized is indicated on the diagram.

Still referring to FIG. 2, if no mix is dispensed during a predetermined number of compressor off-on cycles, it is assumed that the auger 19 should be driven to make the consistency of the mix in freezer cylinder 16 uniform and of proper viscosity. Thus, by means which will be explained, the controller effectuates energization of the red make-ready lamp 55 to indicate to the operator that make-ready switch SW4 should be depressed when dispensation of mix from the spigot 22 is contemplated. Operation of this make-ready switch will cause the auger motor 20 and the refrigerator compressor 10 to be energized and, if no mix were dispensed, the auger motor and compressor would run until proper consistency of the mix is reached, resulting in the torque on the motor increasing and its wattage increasing to bring about termination of compressor and auger operation as previously mentioned. At any time that product is dispensed, however, the timer, to be discussed later, is automatically reset to start its timing of the off periods of the refrigerator after it shuts off. In fact, if product is dispensed after only two idle period or energy saving cycles, the timer will reset and renew the off-on timing cycles. Whenever the spigot 22 is opened to dispense product, or the make-ready switch SW4 is operated, both the auger drive motor 20 and the refrigerator compressor 10 turn on. As will be seen later when the controller structure is further described, both will stay on as long as the spigot is open. When the spigot is closed, the auger drive motor 20 and the compressor 10 will remain on for a minimum of a certain number of seconds, such as twelve, or until the wattage dependent consistency monitor senses that the product has reached its proper consistency. FIG. 2 exemplifies at points marked 81 and 81' where the motors would have shut off because the set point wattage was reached but both of the compressor and auger motor turned on again because the spigot was opened to withdraw product. A detailed description of the structural and functional features of the circuitry in FIG. 1 will now be resumed.

Assume that the system has been inactive and is to be powered-up for freezedown. The first thing the operator does is close the ganged switches SW1A and SW1B for energizing power supply 44 and closing the circuits for the compressor control relay 34 and auger motor relay 32, although these motors do not start as yet. When the power goes on, the red make-ready lamp 55 goes on for reasons which will be described later. The lamp indicates to the operator that the previously mentioned make-ready switch SW4, shown adjacent power supply 44, should be closed. When SW4 is closed, a signal is delivered through it and by way of a line 85 to a latch circuit which is symbolized by the block marked 86. The latch circuit is implemented with electronic elements but is functionally equivalent to a latching relay. One of the output lines 87 from the latch circuit is a control signal input to a switching circuit 88 which is identified an an "output auger" circuit since it is involved in causing auger motor 20 to run. When the make-ready SW4 is closed and the latch circuit provides a signal to the output auger circuit 88, the latter switches and applies a positive voltage to line 46, thereby causing the relay coil 41 to be energized. This closes contacts 39 for permitting the higher power level relay coil 34 to be energized. Relay coil 34 then closes contacts 33 and causes auger motor 20 to be energized from power lines 23 and 24. Auger 19 is now agitating the mix in freezing cylinder 16. Output auger circuit 88 provides a signal by way of line 89 to a time delay circuit which is represented by a block having that legend and the reference numeral 90. Time delay circuit 90 is indicated to be a three-second timer but it can be set for other time periods. The purpose of the time delay circuit is to cause the motor in refrigerator compressor 10 to turn on a short time after the auger motor turns on and to turn off a short time after the auger motor turns off. Thus, switching transients are not reflected as extensively through the entire control system. In any event, after the short time delay interval imposed by timer 90 has expired, it provides a signal by way of its output line 91 to a circuit that has the legend "output compressor" and is identified by the numeral 92. Output compressor circuit 92 is a switching circuit involved in causing the refrigerator 10 motor to run and is enabled by the signal from the time delay circuit 90. Circuit 92 responds by supplying a positive voltage by way of line 47 to compressor motor relay coil 42. This causes contacts 40 to close and energize relay coil 32. When the latter coil is energized, line contacts 31 close to energize the motor in refrigerator compressor unit 10 by way of power lines 11 and 12. The motors for the auger and compressor are now running concurrently. The viscosity of the mix in cylinder 16 is now increasing. The current to the auger motor 20 is being sensed by way of current transformer 57 and the multiplier 62 is producing the output signal on line 64 which is representative of the wattage being supplied to auger drive motor 20 as was previously explained.

The signal on line 64 representative of auger motor wattage is an input to a block labelled consistency adjustment and having the reference numeral 95. Block 95 is basically an analog signal comparator. It is supplied with a positive dc voltage that can be raised or lowered by adjusting potentiometers 96, 97 and 99. Potentiometers 96 and 97 are sized such that they can provide a larger change in voltage, acting as a coarse adjustment. Switch 98 can be switched to put potentiometer 96 in the circuit to set the consistency adjustment circuit 95 for making shakes or to put potentiometer 97 in the circuit for obtaining a suitable mix consistency or viscosity for making cones.

The signal from the multiplier on line 64 is fed to the negative side of the comparator. The signal from the circuit including potentiometer 99, 96 or 97 and switch 98 is fed to the positive side of the comparator. When the signal on line 64 becomes greater than that being supplied through the switch and potentiometer circuit the output 100 of the comparator switches to ground. Each switching spike which occurs as the product approaches consistency causes the LED 106 to flash. This aids in setting the control to the desired consistency cutout point. Moreover, it is intended that latch circuit 86 should not open to cause the auger and refrigerator motors to stop until a predetermined number of spikes occur. This is accomplished with the averaging circuit that is represented by the block marked 101. The averaging circuit 101 smooths the spikes, which actually result from the auger motor encountering short term variations in load. For instance, the mix in the cylinder 16 may be more frozen or solidified in some zones than in others so that auger 19 encounters variable countertorque as it rotates or there may be imperfections in the drive system that cause load variations.

The smooth analog output signal from averaging circuit 101 is fed by way of a line 102 back to latch 86 which is basically a comparator. If the wattage being consumed by the auger drive motor 20 corresponds to a viscosity below a set point, the output signal on line 102 will be below a threshold level. Hence, the latch 86 will remain set. As consistency of the mix increases, however, the output signal on line 102 from the averaging circuit will eventually exceed the set point and the threshold level of the latch circuit 86 in which case the latch circuit will be switched to turn off. The signal state on output line 87 of latch circuit 86 then changes and the output auger circuitry 88 responds by deenergizing relay 41 to bring about deenergization of the auger drive motor 20. This corresponds, for example, to the point in time marked 70 in FIG. 2. The previously mentioned three-second time delay 90 in FIG. 1 responds to a signal on line 89 indicative of the output auger or switching circuit 88 having changed state by initiating another three-second time delay period. At the end of this period the time delay operates the output compressor switching circuit 92, that is, the latter effectuates deenergization of the refrigerator compressor motor control relay 42 to thereby terminate refrigeration. This corresponds to the point in time marked 71 in FIG. 2. The system now goes into its power-saving mode as will be described shortly hereinafter.

Before such description, some collateral matters will be discussed. Notice, for example, that next to latch circuit 86 there is a block marked "minimum (min.) run timer" which has the reference numeral 103. In the commercial embodiment, by way of example and not limitation, this timer measures a twelve-second interval. Its purposes are to make sure that whenever the motors are energized they will run for at least twelve seconds to pass out of their starting current interval and to agitate and assure a consistently blended mix before starting to sense its consistency. Thus, the minimum run timer 103 responds to the latch circuit 86 being set by providing a signal that results in the consistency adjustment circuit maintaining an output signal that is below the set point so that the signal feeding through the averaging circuit 101 remains for 12 seconds.

Another factor to be discussed before discussing the power-saving mode is the matter of controlling and using the information provided by the indicator lamps 55 and 56. The manner in which the system is powered up and operated until initial set point consistency of the mix is obtained has just been described. When power first comes on this condition is sensed by a start-up lamp set circuit symbolized by the block marked 108. It has a power input and a signal output line 109 which leads to a block 110 that is labelled "make-ready lamp" and is essentially a flip-flop circuit. Flip-flop circuit 110 has output conductors 111 leading to lamp driver circuits represented by the block marked 112. When power first comes on, start-up lamp set circuit 108 provides an input signal to the flip-flop circuitry in block 110 to cause the output state of the flip-flop to be that which results in the red make-ready lamp 55 going on. It will go on even before the momentary make-ready switch SW4 has been turned on to initiate mix freezing and agitation. The fact that the make-ready lamp 55 is on suggests to the operator that the make-ready switch SW4 should be operated. Thus, the start-up lamp set circuit 108 is a way of being positive that the red make-ready lamp 55 will go on when power is first turned on.

Means are provided for turning off the make-ready lamp 55 and turning on the green ready lamp 56 when set point consistency of the mix has been attained. An "output auger" detector circuit symbolized by the block marked 113 is involved in this function. It detects whether or not the auger motor 20 is energized. It has a signal input line 114 fed from an output of the output auger switching circuit 88. The output auger detector circuit 113 detects when the auger is on and when it shuts off upon set point being reached, there is a signal level change on line 14 which causes the auger output detector 113 to deliver a signal by way of its output line 115 to the make-ready lamp or flip-flop circuit 110. This signal changes the output state of the flip-flop. The output state change causes the lamp driver circuit 112 to turn off the red make-ready lamp 55 and turn on green ready lamp 56. The operator is now apprised visually that the mix is in a ready-to-serve condition. The auger output detector circuit 113 and start-up lamp set circuit 108 are involved in controlling the lamp when the system is in the power-up mode. They are also involved at any time that the auger motor and refrigerator motor are switched on by operation of make-ready switch SW4 or spigot switch SW3 and the make-ready light 55 is on prior to activating a switch. The lamps are controlled by other means during the times when the system is in the electrical energy-saving mode which will now be described.

As explained earlier in reference to the FIG. 2 timing diagrams, when set point consistency is reached for the first time, the auger motor and the refrigerator motor turn off at the points in time marked 70 and 71, respectively. If no mix product is withdrawn through spigot 22, that is, if spigot switch SW3 is not operated, the system will go into its energy-saving mode wherein it only uses that minimum of electric power which is required to keep the mix at a temperature that will result in it having a reasonably high viscosity but not necessarily uniform viscosity through the volume of the cylinder 16. In other words, during the energy-saving mode only the refrigerator compressor will turn on for short intervals between long intervals and the auger drive motor will not run during that time unless it is commanded to do so by the operator. As previously mentioned in connection with FIG. 2, the first time-delay period following proper mix consistency having been reached is indicated by the numeral 72. It is followed by short intervals such as the one marked 73 during which the refrigerator motor is turned on for a short interval. How this is done will now be discussed in reference to FIG. 1.

The off time of the refrigerator compressor 10 during the energy-saving mode depends on the ambient temperature. The on time is governed by a measured time interval and remains constant at whatever time it is set.

The ambient temperature is sensed by an electronic temperature-to-voltage converter which is symbolized by the block marked 120 in the left region of FIG. 1. This is a commercially available circuit element. It provides an analog signal on its output line 121 which corresponds in magnitude to prevailing ambient temperature. The slope of the temperature versus output signal amplitude is settable by adjusting a potentiometer 119. A typical contemplated ambient temperature range that must be taken into account for a soft-serve freezer such as is here under consideration is 70° F. to 110° F.

The analog output signal from the temperature converter 120 is fed by way of line 121 to a voltage-to-time converter represented by the block marked 122. The converter circuit 122 is basically a voltage controlled oscillator which outputs pulses on line 123 at a rate which increases and decreases in correspondence with ambient temperature. The objective is to use the pulse rate as a measure of time to have the refrigerator motor off cycles be shorter as ambient temperature rises to compensate for the greater loss through the refrigerator coil insulation 18 as ambient temperature increases.

The quiescent or refrigerator off time periods are determined with a pulse-counting circuit which is symbolized by the block marked 124 and which, for the sake of illustration and not limitation, is designated as a divide-by-10 counter. By way of example, if the output pulse rate from the converter 122 is one pulse every half minute, dividing by ten or counting every tenth pulse would result in an output signal from divide-by-ten counter every 5 minutes. This might correspond roughly to an ambient temperature of about 70° F. and a measured time period of about 15 minutes.

Each time a count representative of an off time interval of a certain number of minutes corresponding to prevailing temperature terminates, a signal is sent from divide-by-ten counter 124 by way of a line 125 to a compressor run timer represented by the block marked 126. Timer 126 may be based on a type 556 integrated circuit timer, not shown. When it receives a trigger signal over line 125 it changes the state of its output which results in a signal being delivered over output line 127 to time-delay circuit 90. The signal is coupled through the time delay circuit to the output compressor circuit 92 which then effectuates grounding of relay coil line 47 to energize coil 42 and cause the refrigerator compressor motor to turn on. The length of time that the compressor remains on during this and ensuing energy-saving mode cycles is determined by compressor run timer 126. By way of example and not limitation, timer 126 may keep the refrigerator compressor on for about 50 seconds although this is a matter of choice and depends on the parameters of a particular freezer system. The refrigerator on time is adjustable but constant for any particular adjustment. Selection of adjustment of the on-time interval can be made with a potentiometer 128 which is in a time constant circuit, not fully shown, associated with the timer 126. Typical refrigerator run intervals during the energy-saving mode are illustrated by the intervals marked 73, 75 77 and 79 in FIG. 2. At the end of each refrigerator on period, compressor output circuit 92 sends a reset signal by way of line 129 to the pulse counter 124 to zero it to begin timing out the next refrigerator off period.

If the mix in cylinder 16 is just refrigerated cyclically during the energy-saving mode and is not agitated by the auger, eventually the mix is likely not to have uniform viscosity throughout its volume. The controller provides for indicating to the operator that the mix should be agitated and refrigerated or made ready before any mix is dispensed from spigot 22. Another counter symbolized by the block marked 130 is provided for giving the operator this indication. Counter 130 bears the legend, divide by 3, but it should be understood that this is a programmable counter that might be set to divide by 2 through 6, for instance. Counter 130 has an input line 131 from counter 124. Considering that counter 130 is a divide-by-3 counter for the sake of example, it will respond to counting three of the refrigerator off-time periods that are measured by counter 124 by producing an output signal at that time on a line 132. Line 132 is coupled to the make-ready lamps or flip-flop circuit 110. When a signal is received over line 132, the flip-flop circuit changes state and refelcts this change through its output line 111. The result is that the green ready lamp 56 which has been on, is turned off. At the same time, the red make-ready lamp 55 is turned on. This indicates to the operator that make-ready switch SW4 should be closed to effectuate operation of the compressor and auger to assure that the mix in cylinder 16 has a high enough and uniform enough viscosity before any mix is dispensed through the spigot 22.

If the operator does not contemplate having to serve any customer, the operator can simply forego actuating the make-ready switch SW4 until an impending sale. The refrigerator long off-time and short on-time periods will continue to occur cyclically and no power will unnecessarily be consumed by the auger motor.

If, dispensation of product is contemplated, the operator will assuredly actuate make-ready switch SW4 to cause refrigeration and auger agitation of the mix. At any time that mix is dispensed, of course, the compressor and auger immediately turn on as a result of spigot switch SW3 adjacent power supply 44 becoming closed by reason of spigot lever 21 having been actuated. This results in the latch circuit 86 performing the functions which were previously described. Moreover, the consistency detecting multiplier 62, consistency adjustment device 95 and averaging circuit 101 becomes effective to turn on the compressor and auger motor and to turn them off in response to the consistency set point having been reached.

As indicated, the red make-ready lamp comes on if there have been three consecutive refrigerator off or idle period cycles. If product is dispensed after two idle period cycles, for instance, the divide-by-ten counter 124 will reset and start counting over after the refrigerator compressor shuts off and starts its idle cycles over again. The divide-by-three counter 130 also resets in response to a reset signal by way of line 133 from auger output circuit 88. Then the divide-by-three counter starts counting for another three cycles in this illustrative embodiment.

In a number of instances in this description numerical values were used for the sake of clarity that results from using concrete numbers. It should be understood, however, that the operating parameters are selectable. They will be chosen in conformity with the ambient temperatures, physical characteristics of the refrigerating system and the auger mixer and the general environmental conditions under which a particular soft-serve freezer is intended to operate.

Although a preferred embodiment of the invention has been described in considerable detail, such description is intended to be illustrative, rather than limiting, for the invention may be variously embodied and is to be limited only by interpretation of the claims which follow.

I claim:

1. In a soft-serve freezer including a freezing chamber with a spigot, a mixing element, a first motor for said mixing element and a refrigeration system including a second motor for a compressor in said refrigerator system, the improvement comprising control circuit means for said first and second motors, said control circuit means including electric power sensing means associated with said first motor, said control circuit means providing an operational sequence with first and second modes in which said mixing element and said refrigeration system are operating concurrently in a first mode until said power sensing means senses a predetermined power input to said first motor corresponding to a preselected consistency, whereupon said circuit is switched to said second mode wherein said second motor is switched on and off at a selected frequency and said circuit including manually operable mode changing means to change to said first mode with said first motor driving said mixing element in contemplation of the dispensing of product from said spigot and said circuit remaining in said second mode until said manually operable means are actuated.

2. In a soft-serve freezer including a freezing chamber with a spigot, a mixing element, a first motor for said mixing element and a refrigeration system including a second motor for a compressor in said refrigerator system, the improvement comprising control circuit means for said first and second motors, said control circuit means including electric power sensing means associated with said first motor, said control circuit means providing an operational sequence with first and second modes in which said mixing element and said refrigeration system are operating concurrently in a first mode until said power sensing means senses a predetermined power input to said first motor corresponding to a preselected consistency, whereupon said circuit is switched to said second mode wherein said second motor is switched on and off at a selected frequency and said circuit including manually operable mode changing means to change to said first mode with said first motor driving said mixing element in contemplation of the dispensing of product from said spigot and said circuit remaining in said second mode until said manually operable means are actuated, and visual indicator means in said control circuit means indicating that the desired consistency is not available for dispensing after the freezer has been in the second mode for a pre-selected number of cycles and that the freezer should be switched to said first mode.

3. In a soft-serve freezer including a freezing chamber with a spigot, a mixing element, a first motor for said mixing element and a refrigeration system including a second motor for a compressor in said refrigerator system, the improvement comprising control circuit means for said first and second motors, said control circuit means including electric power sensing means associated with said first motor, said control circuit means providing an operational sequence with first and second modes in which said mixing element and said refrigeration system are operating concurrently in a first mode until said power sensing means senses a predetermined power input to said first motor corresponding to a preselected consistency, whereupon said circuit is switched to said second mode wherein said second motor is switched on and off at a selected frequency and said circuit including manually operable mode changing means to change to said first mode with said first motor driving said mixing element in contemplation of the dispensing of product from said spigot and said circuit remaining in said second mode until said manually operable means are actuated,
- an ambient temperature sensing means in said control circuit means and wherein the duration of off periods for said second motor during the second mode are determined by ambient temperature sensed by said temperature sensing means, and
- timer means in said control circuit means whereby the duration of the on periods for said second motor during the second mode are determined.

4. In a soft-serve freezer including a freezing chamber with a spigot, a mixing element, a first motor for said mixing element and a refrigeration system including a second motor for a compressor in said refrigerator system, the improvement comprising control circuit means for said first and second motors, said control circuit means including electric power sensing means associated with said first motor, said control circuit means providing an operation sequence with first and second modes in which said mixing element and said refrigeration system are operating concurrently in a first mode until said power sensing means senses a predetermined power input to said first motor corresponding to a preselected consistency, whereupon said circuit is switched to said second mode wherein said second motor is switched on and off at a selected frequency and said circuit including manually operable mode changing means to change to said first mode with said first motor driving said mixing element in contemplation of the dispensing of product from said spigot and said circuit remaining in said second mode until said manually operable means are actuated, said control circuit means including first and second light indicators with said first light indicator indicating that the product does not have the desired consistency for serving and said second light indicator indicating that the power input level to the auger has achieved a pre-selected level and that said product has achieved the selected consistency and wherein said second light turns off after a pre-selected time interval during the second mode to indicate that the freezer should be switched to said first mode to activate the mixing element prior to dispensing product.

5. In combination with a soft-serve freezer including a cylinder and refrigeration coils for freezing a consummable mixture in the cylinder, spigot means for dispensing frozen mixture from the cylinder, an auger in the cylinder for agitating the mixture, an auger drive motor coupled to the auger, a refrigeration compressor for supplying refrigerant to said coils and a refrigerator motor for driving the compressor, and an improved control circuit means for the freezer said control circuit means comprising:

sensing means for sensing the electric power input level to said auger motor to thereby provide an indication of the viscosity of the mixture, means for responding to said sensing means to cause said control means to deenergize said auger and compressor motors when a predetermined power load has been sensed, first and second electric light sources and switching means for selectively turning said light sources on and off, said switching means being operative to keep said first light source turned on during the time said motors are energized and bring the mix to the desired consistency and to turn off said first light source when said predetermined power input to said auger motor is attained and then to turn on said second light source to indicate that the desired consistency has been attained and said mixture is ready to serve.

6. In combination with a soft-serve freezer including a cylinder and refrigeration coils for freezing a consummable mixture in the cylinder, spigot means for dispensing frozen mixture from the cylinder, an auger in the cylinder for agitating the mixture, an auger drive motor coupled to the auger, a refrigeration compressor for supplying refrigerant to said coils and a refrigerator motor for driving the compressor, and an improved controller for the freezer comprising:

first control means for causing energization and deenergization of said auger motor, second control means for causing energization and deenergization of said refrigerator motor, a manually operable switch, said first and second control means responding to operation of said switch by energizing said auger motor and refrigerator motor for respectively agitating and cooling said mixture in the cylinder, sensing means for sensing the electric power input level to said auger motor to thereby provide an indication of the viscosity of the mixture, means for responding to said sensing means sensing a predetermined power level by causing said first and second control means to deenergize said auger and compressor motors, two electric light sources and switching means for selectively turning said light sources on and off, said switching means being operative to keep one light source turned on during the time said motors are energized and to turn off said one light source when said predetermined power input to said auger motor is attained and then to turn on the other light source to indicate that said mixture is ready to serve, timer means for providing timing cycles composed of a sequence of alternating first and second timing periods, the first period in the first cycle commencing when said motors become deenergized and periods of substantially similar duration being provided between each of the second time periods, said refrigerator motor control means responding to occurrence of said second time periods by energizing said refrigerator motor for the duration of said second time periods to thereby provide for cooling said mixture periodically without energizing the auger motor.

7. In combination with a soft-serve freezer including a cylinder and refrigeration coils for freezing a consummable mixture in the cylinder, spigot means for dispensing frozen mixture from the cylinder, an auger in the cylinder for agitating the mixture, an auger drive motor coupled to the auger, a refrigeration compressor for supplying refrigerant to said coils and a refrigerator motor for driving the compressor, and an improved controller for the freezer comprising:

first control means for causing energization and deenergization of said refrigerator motor, second control means for causing energization and deenergization of said refrigerator motor, a manually operable switch, said first and second control means responding to operation of said switch by energizing said auger motor and refrigerator motor for respectively agitating and cooling said mixture in the cylinder, sensing means for sensing the electric power input level to said auger motor to thereby provide an indication of the viscosity of the mixture, means for responding to said sensing means sensing a predetermined power level by causing said first and second control means to deenergize said auger and compressor motors, two electric light sources and switching means for selectively turning said light sources on and off, said switching means being operative to keep one light source turned on during the time said motors are energized and to turn off said one light source when said predetermined power input to said auger motor is attained and then to turn on the other light source to indicate that said mixture is ready to serve, timer means for providing timing cycles composed of a sequence of alternating first and second timing periods, the first period in the first cycle commencing when said motors become deenergized and periods of substantially similar duration being provided between each of the second time periods, said refrigerator motor control means responding to occurrence of said second time periods by energizing said refrigerator motor for the duration of said second time periods to thereby provide for cooling said mixture periodically without energizing the auger motor, said controller including counter means responsive to a predetermined number of timing cycles having occurred by causing said light source switching means to turn off said first light source and turn on the other said second light source for the latter to indicate to the operator that said manually operable switch should be actuated to energize said compressor and auger motors to recondition said mixture for serving.

8. The controller according to claim 7 wherein said timer means comprises a first timer for providing said first time periods whose durations are inversely proportional to ambient temperature and a second timer for providing second time periods of a selected constant duration.

9. In a soft-serve freezer including a freezing chamber with a spigot, a mixing element, a first motor for said mixing element and a refrigeration system including a second motor for a compressor in said refrigeration system, the improvement comprising control circuit means for said first and second motors, said control circuit means including electric power sensing means associated with said first motor, said control circuit means providing an operational sequence with first and second modes in which said mixing element and said refrigeration system are operating concurrently in a first mode until said power sensing means senses a predetermined power input to said first motor corresponding to a pre-selected consistency, whereupon said circuit is switched to said second mode wherein said second motor is switched on and off at a selected frequency and said circuit including manually operable mode changing means to change to said first mode with said first motor driving said mixing element in contemplation of the dispensing of product from said spigot and said circuit remaining in said second mode until said manually operable means are actuated and first and second signal lights connected in said circuit with said first light indicating that the product is not at the selected consistency and that the freezer should be switched to said first mode and said second light indicating that the desired consistency has been attained and that the product is ready to be dispensed.

10. In a soft-serve freezer including a freezing chamber with a spigot, a mixing element, a first motor for said mixing element and a refrigeration system including a second motor for a compressor in said refrigeration system, the improvement comprising control circuit means for said first and second motors, said control circuit means including electric power sensing means associated with said first motor, said control circuit means providing an operational sequence with first and second modes in which said mixing element and said refrigeration system are operating concurrently in a first mode until said power sensing means senses a predetermined power input to said first motor corresponding to a pre-selected consistency, whereupon said circuit is switched to said second mode wherein said second motor is switched on and off at a selected frequency and said circuit including manually operable mode changing means to change to said first mode with said first motor driving said mixing element in contemplation of the dispensing of product from said spigot and said circuit remaining in said second mode until said manually operable means are actuated and first and second signal lights connected in said circuit with said first light indicating that the product is not at the selected consistency and that the freezer should be switched to said first mode and said second light indicating that the desired consistency has been attained and that the product is ready to be dispensed, and means to reset said counter means upon actuation of said spigot means after said mixture is ready to serve.

* * * * *